United States Patent
George et al.

(10) Patent No.: US 11,470,781 B2
(45) Date of Patent: Oct. 18, 2022

(54) METHOD AND APPARATUS FOR SELECTIVELY HARVESTING CROPS

(71) Applicant: KMS PROJECTS LIMITED, Syston (GB)

(72) Inventors: Estwick George, Leicester (GB); Peter Keeling, Syston (GB)

(73) Assignee: KMS Projects Limited, Syston (GB)

( * ) Notice: Subject to any disclaimer, the term of this patent is extended or adjusted under 35 U.S.C. 154(b) by 429 days.

(21) Appl. No.: 16/307,758

(22) PCT Filed: Jun. 7, 2017

(86) PCT No.: PCT/GB2017/051656
§ 371 (c)(1),
(2) Date: Dec. 6, 2018

(87) PCT Pub. No.: WO2017/212267
PCT Pub. Date: Dec. 14, 2017

(65) Prior Publication Data
US 2019/0297778 A1    Oct. 3, 2019

(30) Foreign Application Priority Data

Jun. 7, 2016 (GB) ..................................... 1609914

(51) Int. Cl.
*A01D 46/30* (2006.01)
*A01D 45/26* (2006.01)

(52) U.S. Cl.
CPC ............. *A01D 46/30* (2013.01); *A01D 45/26* (2013.01)

(58) Field of Classification Search
CPC ................................ A01D 46/30; A01D 45/26
See application file for complete search history.

(56) References Cited

U.S. PATENT DOCUMENTS

| 7,854,108 | B2* | 12/2010 | Koselka | A01B 51/026 56/10.2 A |
| 8,381,501 | B2* | 2/2013 | Koselka | A01D 46/30 56/10.2 A |
| 10,464,217 | B1* | 11/2019 | Phan | B25J 19/02 |

(Continued)

FOREIGN PATENT DOCUMENTS

| CN | 102914967 A | 2/2013 |
| CN | 203152023 U | 8/2013 |

(Continued)

OTHER PUBLICATIONS

International Search Report and Written Opinion for PCT/GB2014/051656.

(Continued)

*Primary Examiner* — Adam J Behrens
(74) *Attorney, Agent, or Firm* — Caesar Rivise, PC

(57) ABSTRACT

An apparatus (1) for harvesting crops, the apparatus (1) comprises a carriage (2), sensing means (3), a ground motion sensor (6) and a harvesting device (4), where the sensing means (3) is configured or configurable to determine the location of a first crop, the ground motion sensor (6) is operated or operable to determine the motion of the carriage (2) relative to the ground, the location data and the motion data being utilized to cause the harvesting device (4) to move to and harvest the first crop.

19 Claims, 8 Drawing Sheets

(56) References Cited

U.S. PATENT DOCUMENTS

| | | | | |
|---|---|---|---|---|
| 2006/0213167 A1* | 9/2006 | Koselka | ............... | A01B 79/005 56/10.2 A |
| 2010/0292841 A1* | 11/2010 | Wickham | ............... | B25J 9/1679 700/259 |
| 2011/0137456 A1* | 6/2011 | Koselka | ................ | A01D 46/30 700/245 |
| 2013/0204437 A1* | 8/2013 | Koselka | ................ | A01D 91/00 700/259 |
| 2018/0263188 A1* | 9/2018 | Herman | ............... | A01D 46/005 |
| 2019/0053430 A1* | 2/2019 | Molenaar | ............... | A01D 45/26 |

FOREIGN PATENT DOCUMENTS

| | | | | |
|---|---|---|---|---|
| CN | 203646089 U | | 6/2014 | |
| CN | 203650549 U | | 6/2014 | |
| EP | 2289304 | | 3/2011 | |
| GB | 2432096 A | | 5/2007 | |
| JP | H03198714 | | 8/1991 | |
| JP | H 0515235 | | 1/1993 | |
| WO | WO-2006013593 A1 | * | 2/2006 | ............. A01D 46/30 |
| WO | WO 2010/063075 | * | 6/2009 | ............. A01D 46/30 |
| WO | WO-2010063075 A1 | * | 6/2010 | ............. A01D 46/30 |
| WO | WO 2010063075 A1 | | 6/2010 | |
| WO | WO 2017135809 | | 8/2017 | |

OTHER PUBLICATIONS

International Search Report dated Nov. 29, 2016.
International Search Report dated Nov. 28, 2017.

* cited by examiner

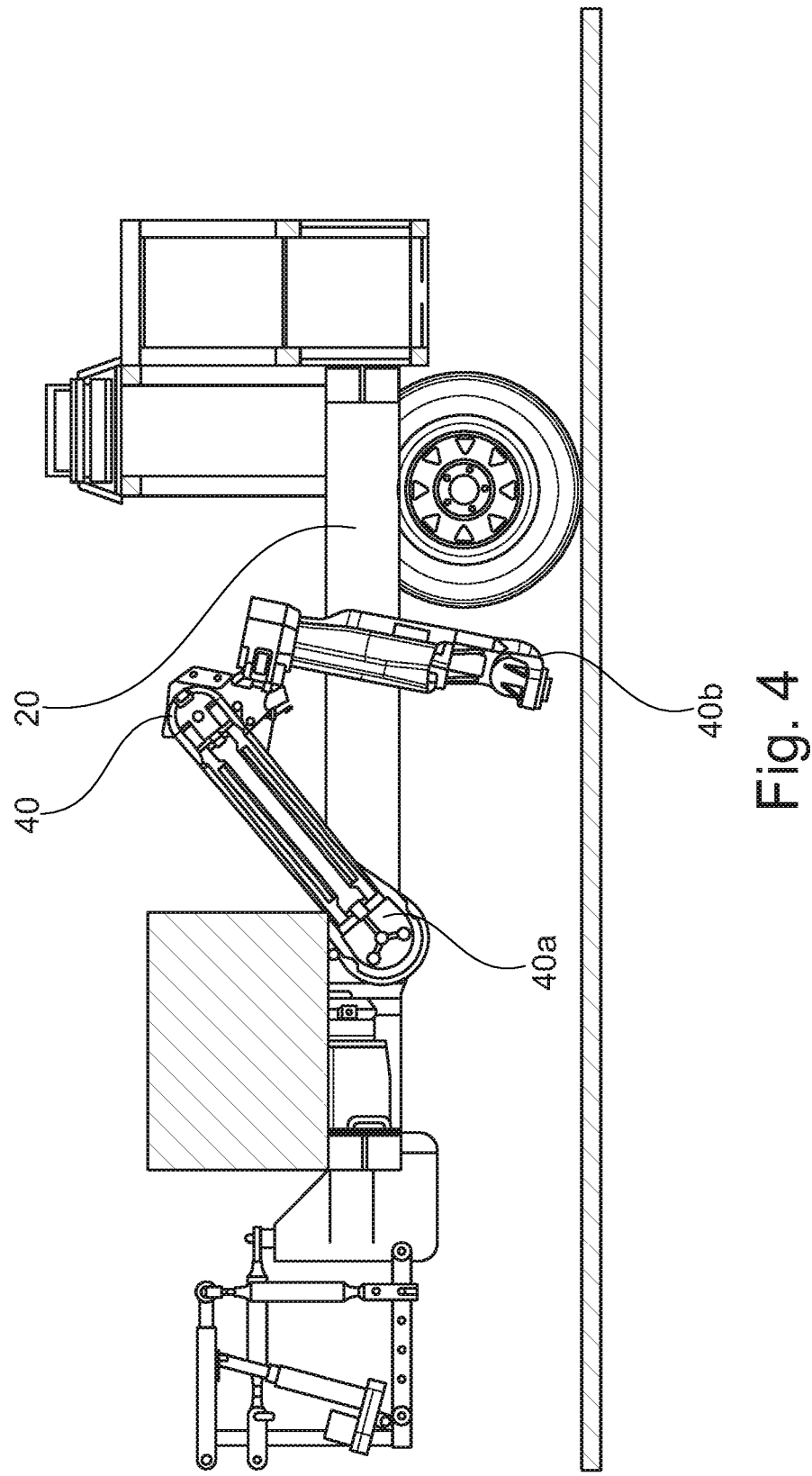

METHOD AND APPARATUS FOR SELECTIVELY HARVESTING CROPS

CROSS-REFERENCE TO RELATED APPLICATIONS

This US National Phase Application claims the benefit under 35 U.S.C. § 371 of PCT/GB2017/051656, filed Jun. 7, 2017, which claims priority to GB 1609914.5, filed Jun. 7, 2016, entitled HARVESTING OF CROPS and whose contents of which applications are incorporated herein by reference in their entireties for all purposes.

This invention relates generally to the harvesting of crops and to a device for so doing. More specifically, although not exclusively, this invention relates to the selective harvesting of crops and to a device for so doing.

Crops have traditionally been harvested by hand which is an arduous and time-consuming process. Consequently, hand harvesting of crops is an expensive process and crops harvested in this manner incorporate this expense in the cost to the consumer. The specific expense is dependent, at least in part, on the wage-bill paid to the work-force and the efficiency of that work-force at harvesting crops. The wage-bill of work-forces is projected to increase which will therefore result in a greater expense of harvesting and consequentially crops which are more expensive for the consumer. This increase is particularly evident in the United Kingdom, where a 'National Living Wage' was brought into force in April 2016 by the UK Government. This measure ensures that workers must be paid a relatively increased base wage for their work, which will consequently lead to an increase in the expense of manual harvesting and therefore of manually harvested crops.

It is known to harvest crops utilizing automated methods. However, these automated methods have a variety of drawbacks, not least, in at least some cases, the indiscriminate nature of the crops harvested thereby. Moreover, with known automated methods unwanted matter (or contaminates) may be disadvantageously harvested along with crops, for example soil and/or weeds. Such contaminated harvested crops require further post-processing to separate the useful crops from the contaminates.

Not all crop plants grow at the same rate. For example, certain crops will fail to grow or will grow in an undesirable manner and/or into an undesirable form. Consumers of crops, for example wholesalers or end-consumers, commonly demand stringent standards concerning the attributes of crops supplied to them. These attributes may include the size, shape, colour, ripeness, quantity of additional crop plant (e.g. root, stalk and/or foliage) still attached, etc. of the crops. For example, it is known for some retailers to require that broccoli crops sold by them are between a maximum and a minimum size and/or that a stalk is still attached to the broccoli crop, where the stalk is between a minimum and maximum size (e.g. length).

Moreover, during harvesting it is disadvantageous to harvest crops below a minimum threshold size or threshold ripeness or which are damaged or defective in some other fashion. Such crops may not be saleable to an intermediary (for example a wholesaler or supermarket) or consumer and will therefore be wasted. If such crops are not harvested they may continue to grow and/or ripen and consequently achieve a saleable size and/or ripeness in due course. Furthermore, it is known for some intermediaries to require only crops having specific characteristics. Some intermediaries or consumers require only crops having characteristics which lie between specific limits, for example which are sized between minimum and maximum size limits. Such intermediaries or customers may reject a consignment of crops delivered to them if a certain quantity and/or percentage of the delivered crops have conditions which lie outside of these specific limits. Therefore, it is known, after harvesting crops to sort the crop according to one or more set conditions prior to delivery of said crops to an intermediary or customer. However, this sorting is time consuming and, consequently, increases the expense of the delivered crops.

It is therefore a first non-exclusive object of the invention to provide a method, system and/or apparatus which overcomes or at least partially mitigates one or more of the above problems. It is a further non-exclusive object of the invention to provide a method, system and/or apparatus which harvests crops more efficiently, with a greater degree of selectivity and/or with reduced expense.

Accordingly, a first aspect of the invention provides a method for harvesting crops in a single pass over said crops using a carriage provided with a harvesting device, the method comprising:
  a) determining location data relating to a first crop;
  b) capturing motion data of the carriage relative to the ground using a ground motion sensor; and
  c) utilizing the location data and the motion data thereby causing the harvesting device to move to and harvest the first crop.

Preferably the carriage, in use, continuously moves.

It will be appreciated by one skilled in the art that capturing motion data of the carriage relative to the ground using a ground motion sensor is distinct from and/or more accurate than capturing position data of the carriage using a Global Positioning System (GPS) device or using data relating to the output of a prime mover (e.g. data from an electronic control unit connected to one or more sensors monitoring said prime mover).

One skilled in the art will appreciate that a crop plant comprises a crop to be harvested and ancillary crop plant parts, for example one or more of stalks, roots and/or additional foliage. In this specification where a crop is mentioned this refers to that part of a crop plant which is harvested or which may be suitable for harvest, and where the remaining crop plant is mentioned this refers to the unharvested or unsuitable ancillary crop plant part or parts. For example, for crop plant members of the brassica family the crop plant may comprise a crop comprising a head or crown (comprising florets and trunks) and a portion of the stalk, whilst the remaining crop plant parts may comprise outer foliage and/or roots and/or at least a portion of the stalk. Consequently, for the brassica family, it may be advantageous to preferentially harvest the head or the head and a portion of the stalk.

The method may comprise a step d) comprising determining the suitability of the first crop for harvesting, where step d) occurs prior to or concurrent with step a) or subsequent to step a) but prior to step c). Steps b) and c) or step c) may be interrupted if the first crop is determined not to be suitable for harvesting. The location data and/or motion data may be captured. If in step d) the suitability is such that the first crop is not harvested, the captured data may be stored, for example in a memory, e.g. a computer readable memory.

Determining the suitability of the first crop for harvesting may comprise capturing condition data relating to the first crop. Determining the suitability of the first crop for harvesting may comprise comparing the captured condition data of the first crop with a database of crop condition data. The database of crop condition data may be stored on a remote server and/or local memory. The method may comprise communicating with the remote server and/or local memory, for example in order to determine whether the first crop is suitable for harvesting.

The crop condition data, where determined, may comprise one or more of the size, the shape or the colour of part or the whole of the first crop (hereafter one or more parameters). The size may comprise the height of the crop, for example the height of at least a portion of the crop, e.g. where the height may be relative to the ground and/or relative to a datum (in this specification we refer to height as being measured along the z-axis). Additionally or alternatively, the size may comprise the width, diameter and/or volume of the whole or part of the crop. In this specification the width and/or diameter of the crop are measured along the x and y axes, both being orthogonal to the z-axis and to one another. Determining the suitability of the first crop for harvesting may comprise determining whether one or more measured parameters e.g. a size parameter of the first crop is greater than a predetermined minimum parameter e.g. a size parameter and/or is less than a predetermined maximum parameter e.g. a size parameter. Capturing condition data relating to the first crop may comprise causing image capture means or device(s) to capture image data relating to the condition of the first crop. The condition data may be stored on a memory means or memory, for example comprising a remote server and/or local memory.

During or after determining the location data the method may comprise causing sensing means or sensor(s) to capture sensor data. The sensing means or sensor(s) may comprise image capture means or device(s), e.g. which is configured or configurable to capture image data relating to the location of the first crop. The location data relating to the first crop may be determined from the image data. The location data may comprise x, y and z coordinates. The z coordinate(s) may comprise data relating to the height of a portion of the first crop, for example relative to the ground and/or relative to a datum of the carriage. The datum of the carriage may be a datum which moves in concert with the carriage.

The location data may comprise coordinates relative to the datum of the carriage, (e.g. of the frame of the carriage, where provided), for example and wherein generating positioning data may comprise modifying the location data with the motion data. The location data and/or an indication of whether the crop was harvested may be stored on a memory means or memory, for example comprising a remote server and/or local memory. The location data may comprise coordinates relative to a stationary datum which does not move in concert with the carriage and wherein generating positioning data may comprise using the location data and the motion data. The location data may comprise x, y and z coordinates, e.g. and where the z coordinates comprise data relating to the height of at least a part of the first crop relative to the ground and/or a datum of the carriage, i.e. along the z-axis. The at least a part of the first crop may be the head of the crop. The at least a part of the first crop may comprise that part of the crop generally at greatest height above the ground and/or at the least distance from the datum (in the z-axis direction) of the carriage (e.g. of the frame). Additionally or alternatively, the at least a part of the first crop may comprise the highest part of the crop and/or crop plant.

Step c) may comprise generating positioning data based on the location data and the motion data, for example and causing the harvesting device to move to and harvest the first crop using the positioning data.

Generating positioning data may comprise determining or calculating the distance (for example in the z-axis direction) between the or a datum of the frame and the top or peak of the first crop.

The harvesting device may comprise a robotic arm and step c) may comprise moving the robotic arm to the first crop.

The harvesting device may comprise a receptacle and the method may further comprise step c) comprising moving the receptacle over the first crop such that at least a portion of said first crop is located within said receptacle. The method may comprise step c) further comprising severing the at least a portion of the first crop located within the receptacle from the remainder of the crop plant. The method may comprise a step e) comprising moving the receptacle over a second crop such that at least a portion of the second crop is located within the receptacle, e.g. wherein the at least a portion of the first crop is retained within the receptacle prior to step d). Step e) may comprise: determining location data relating to the second crop; capturing motion data of the carriage relative to the ground using the ground motion sensor; and utilizing the location data and the motion data and thereby causing the harvesting device to move to and harvest the second crop.

The method may further comprise deflecting one or more obstructions adjacent the first crop, wherein said deflection occurs concurrently with moving the receptacle over the first crop.

Causing the harvesting device to move to and harvest the first crop may comprise formulating a path of motion for moving the harvesting device to the detected crop.

The method may comprise a step f) comprising determining or calculating, relative to the carriage, the height of the ground over which the carriage is located or moving. The method may comprise utilizing the determined ground height to modify the path of motion for moving the harvesting device to the detected crop, for example to prevent the harvesting device from moving below the determined height of the ground.

Determining the height of the ground over which the carriage is located or moving may comprise monitoring the height of the ground using a ground height sensor. Determining the height of the ground over which the carriage is located or moving may comprise modifying a known starting height of the ground with height change data. The height change data may be generated by the or a ground height sensor.

Causing the harvesting device to move to and harvest the first crop may comprise determining or calculating the height of the first crop relative to the or a datum of the carriage (e.g. of the frame).

According to a second aspect of the invention there is provided an apparatus for harvesting crops, the apparatus comprising a carriage, a processor, sensing means or sensor(s), a ground motion sensor and a harvesting device, where the sensing means or sensor(s) is configured or configurable to determine the location of a first crop, the ground motion sensor is operated or operable to determine the motion of the carriage relative to the ground, and the processor is programmed or programmable to utilize the location data and the motion data in order to cause the harvesting device to move to and harvest the first crop.

The carriage may be configured to move, in use, in a harvesting direction. The carriage may be configured or configurable to move continuously during use, e.g. to move continuously in a harvesting direction. The sensing means or sensor(s) may be spaced from the harvesting device. The sensing means or sensor(s) may be forward of the harvesting device in said harvesting direction.

The carriage may comprise a front portion and a rear portion. The sensing means or sensor(s) may be attached or attachable at or toward the front portion, e.g. and the harvesting device may be attached or attachable at or toward the rear portion. The carriage may comprise a frame to which the sensing means or sensor(s), processor, ground motion sensor and/or harvesting device may be attached or be attachable.

The sensing means or sensor(s) may comprise image capture means or device(s) configured or configurable to capture image data relating to the location of the first crop. The processor may be operable to determine location data relating to the first crop from the captured image data. The sensing means or sensor(s) may comprise image capture means or device(s) configured or configurable to capture image data relating to the condition of the first crop. The processor may be operable to determine crop condition data of the first crop from the captured image data. The image capture means or device(s) may comprise one or more cameras, e.g. one or more 3D camera and/or one or more 2D camera. The sensing means or sensor(s) may comprise distance sensing means or sensor(s), e.g. one or more of radar, ultrasound and/or one or more optical sensor, for example such as one or more laser and/or LIDAR sensors.

In embodiments the sensing means or sensor(s) may comprise two cameras, for example spaced apart from one another (e.g. by any suitable distance). The two cameras may be operable, in use, to each capture image data relating to the location of the first crop. The processor may be operable to generate stereoscopic image data from the captured image data. The processor may be operable to determine or calculate location data relating to the first crop from the stereoscopic image data. The sensing means or sensors may be operable to generate crop condition data.

Crop condition data (where captured or determined) may comprise one or more crop parameters, for example data relating to one or more of the size, the shape or the colour of part or the whole of the first crop.

The apparatus may comprise memory means or memory storing or configured to store a database of crop condition data. The memory means or memory may be a remote server and/or local memory. The apparatus may comprise communication means or device(s) configured or configurable to communicate with the memory means or memory, e.g. to communicate crop condition data with the memory means or memory. The processor may be configured or configurable to compare captured crop condition data with the database of crop condition data. A pre-determined distance (for example in the z-axis direction) relating to a desired height of harvested crops may be stored on the memory means or memory. A starting or normal height of the datum of the carriage (for example of the frame) above the ground may be stored on the memory means or memory.

Determining the location data may comprise identifying and/or locating the top or peak of the crop, for example by analysing the stereoscopic image data (where produced). The location data may comprise a z coordinate relating to the distance between the datum of the carriage (e.g. of the frame) and the top of the peak or top of the crop. The location data may be modified by the pre-determined distance, e.g. the z coordinate may be modified by the pre-determined distance. The height of the top or peak of the first crop may be determined or calculated, relative to the datum of the carriage (e.g. of the frame), for example by the processor. The distance, in the z-axis direction between the top or peak of the first crop and the datum of the carriage (e.g. of the frame) may be determined or calculated, for example by the processor.

Causing the harvesting device to move to and harvest the first crop may comprise causing the harvesting device (e.g. a blade thereof, where provided) to move to a distance, in the z-axis direction, equal to the calculated or determined height of the peak or top of the first crop relative to the carriage (e.g. to the frame) plus the pre-determined distance. If the determined or calculated height of the ground relative to the datum of the carriage (e.g. of the frame) is less than the calculated or determined height of the peak or top of the first crop plus the pre-determined distance, the harvesting device may be prevented from moving to the pre-determined distance beneath the determined or calculated height of the peak or top of the detected first crop. If the determined or calculated height of the ground relative to the datum of the carriage (e.g. of the frame) is less than the determined or calculated height of the peak or top of the first crop plus the pre-determined distance, the harvesting device may be moved to a location corresponding to the determined or calculated height of the ground relative to the datum of the carriage (e.g. of the frame).

The harvesting device may comprise a receptacle configured or configurable to receive at least a portion of plural crops. The harvesting device may comprise a cutting device operable to sever, in use, at least a portion of a first crop received within the receptacle.

The person skilled in the art will appreciate that the term "at least a portion" of a crop refers to a major or minor portion of a crop or to the entire crop.

The harvesting device may comprise a retention means or retainer configured or configurable to retain at least a portion of one or more crops within the receptacle. The cutting device (where provided) may comprise the retention means or retainer.

The harvesting device may comprise an actuator operable to move the cutting device between a deployed position and a retracted position relative to the receptacle.

The cutting device may comprise one or more blades, e.g. comprising one or more cutting edges. The one or more cutting edges may be configured to sever the at least a portion of a crop from the remainder of the crop plant. One, some or all of the one or more blades may be configured to provide an abutment, in use, against at least a portion of one or more crops within the receptacle, when the one, some or all of the one or more blades are deployed.

The processor may be programmed or programmable, in use, to formulate a path of motion for moving the harvesting device (for example the receptacle) to the first crop.

The harvesting device may comprises a deflection device, e.g. integrally formed with or affixed to the receptacle. The deflection device may be configured or configurable, in use, to deflect one or more obstructions adjacent a crop when the at least a portion of a crop is received within the receptacle.

The deflection device may comprise one or more deflectors configured or configurable to physically contact one or more obstructions adjacent a crop, e.g. thereby to deflect said one or more obstructions. Additionally or alternatively, the deflection device may comprise one or more deflectors configured or configurable to deflect one or more obstructions adjacent a crop via fluid emission thereagainst. Deflection of the one or more obstructions adjacent the crop may comprise deflection of the one or more obstructions at least partially away from said crop.

The receptacle may comprise an opening or aperture configured to allow passage therethrough of at least a portion of a crop, e.g. into the receptacle. The deflection device may be located adjacent the opening or aperture in the receptacle. The deflection device may surround or partially surround the opening or aperture in the receptacle. The deflection device may comprise a projection or skirt subtending a major part of the periphery of the receptacle.

The harvesting device may comprise a robotic arm, e.g. a 6-axis robotic arm. The robotic arm may be attached or attachable at a first end to the carriage. The robotic arm may be attached or attachable at a second end to the receptacle.

The robotic arm may comprise one or more joints. The robotic arm may be attached to the carriage (for example to the or a frame of the carriage) such that the or a joint nearest the attachment extends away therefrom in a direction which is non-parallel to the primary direction in which the frame extends. The joint may extend away from the attachment in a direction which is at an acute angle with respect to the primary direction in which the frame extends. The acute angle may be between about 10 and 80 degrees, for example between about 15, 20, 25, 30, 35, 40 or 45 and 50, 55, 60, 65, 70 or 75 degrees. We have surprisingly found that when the frame of the arm is attached at an acute angle to the carriage, the 'throw' of the arm is improved and harvesting capacity increased.

The ground motion sensor may comprise a relative motion sensor and/or a contact sensor. The relative motion sensor (if provided) may comprise a Doppler effect sensor, a "time of flight" sensor, a phase-shift sensor and/or any other suitable sensor. The relative motion sensor (if provided) may comprise radar, ultrasound and/or one or more optical sensor, for example such as one or more laser and/or LIDAR sensors. The contact sensor (if provided) may comprise a ground contact device, e.g. which may comprise a non-driven wheel. The non-driven wheel may be configured or configurable to contact the ground, in use, for example to roll thereover and/or to rotate relative thereto. Additionally or alternatively, the ground motion sensor may comprise a measurement device, for example an encoder or pulse coder. The measurement device may be configured to measure a characteristic of the ground contact device (where provided). Said characteristic may be the angular or linear displacement and/or the angular or linear velocity and/or the angular or linear acceleration of the ground contact device, e.g. relative to a datum.

The apparatus may comprise a ground height sensor. The ground height sensor may be configured or configurable to determine, in use, the height of the ground over which the carriage is located or moving relative to a or the datum of the carriage (for example of the frame). The processor may be programmed or programmable to formulate a path of motion for moving the harvesting device to a detected crop, e.g. the first crop. The processor may be programmed or programmable to utilize the determined ground height to modify the path of motion, for example to prevent the harvesting device from moving below the determined height of the ground.

The ground height sensor may comprise means or one or more device for contacting the ground, for example one or more ground contact member. The means or one or more device for contacting the ground may be attached or attachable (e.g. movably or rotatably or slidably) to the carriage. The ground height sensor may comprise the or a ground motion sensor, for example one or more component thereof. The ground height sensor may comprise the or a non-driven wheel, for example configured, in use to contact the ground under the carriage. The ground height sensor may comprise an armature connecting the non-driven wheel to the carriage. The armature may be pivotably attached or attachable to the carriage. The ground height sensor may comprise a deflection sensor for measuring the displacement data. The displacement data may correspond to a deflection (for example radial or linear deflection) of the armature relative to the carriage, e.g. relative to a datum of the carriage. The deflection sensor may comprise a potentiometer.

The ground height sensor may be operable to send displacement data to the processor. The processor may be operable to calculate or determine the ground height relative to the datum of the carriage (for example of the frame) based upon the starting or normal height modified by the displacement data.

For the avoidance of doubt, any of the features described herein apply equally to any aspect of the invention.

According to a further aspect of the invention there is provided an apparatus for harvesting crops, the apparatus comprising a receptacle, a cutting device and retention means or retainer, the receptacle configured or configurable to receive at least a portion of plural crops, the cutting device operated or operable to sever, in use, at least a portion of a first crop received within the receptacle from the remainder of the crop plant, and the retention means or retainer is configured or configurable to retain the at least a portion of the first crop within the receptacle prior to receipt therein of the at least a portion of a second crop.

According to a further aspect of the invention there is provided an apparatus for harvesting crops, the apparatus comprising a receptacle and a deflection device, the receptacle configured or configurable to receive at least a portion of a crop, the deflection device configured or configurable, in use, to deflect one or more obstructions adjacent a crop, wherein the deflection device is integrally formed with or affixed to the receptacle.

According to a further aspect of the invention there is provided a method for harvesting crops, the method comprising:
a) moving a receptacle over a first crop such that at least a portion of said first crop is located within said receptacle;
b) severing the at least a portion of the first crop located within the receptacle from the remainder of the crop plant;
c) moving the receptacle over a second crop such that at least a portion of the second crop is located within the receptacle;
wherein the at least a portion of the first crop is retained within the receptacle prior to step c).

According to a yet further aspect of the invention there is provided a method of harvesting a crop, the method comprising:
a) receiving at least a portion of a crop within a receptacle; and
b) deflecting one or more obstructions adjacent said crop;
wherein steps a) and b) occur concurrently, e.g. substantially concurrently.

According to a further aspect of the invention there is provided a method for harvesting crops in a single pass over said crops using a carriage provided with a harvesting device, the method comprising:
a) determining, relative to a datum of the carriage, the height of the ground over which the carriage is located or moving;
b) formulating a path of motion for moving the harvesting device to a detected crop;
c) utilizing the determined ground height to modify the path of motion to prevent the harvesting device from moving below the determined height of the ground.

According to a yet further aspect of the invention there is provided an apparatus for harvesting crops, the apparatus comprising a carriage, a processor, a ground height sensor and a harvesting device, where the ground height sensor is configured or configurable to determine, in use, the height of the ground over which the carriage is located or moving relative to a datum of the carriage, and the processor is programmed or programmable to formulate a path of motion for moving the harvesting device to a detected crop and to utilize the determined ground height in order to modify the path of motion to prevent the harvesting device from moving below the determined height of the ground.

Preferably, the carriage comprises a frame, the frame may define, in plan, the periphery of a harvesting zone, typically a rectangular harvesting zone. In embodiments the harvesting means is able to harvest the first crop from any point within the harvesting zone.

According to a further aspect of the invention there is provided a system for harvesting crops, the system comprising an apparatus comprising a carriage, a processor, a ground motion sensor, a harvesting device and sensing means or sensor(s), wherein the processor is configured to:
a) cause the sensing means or sensor(s) to capture location data relating to the position of a crop;
b) operate the ground motion sensor to capture motion data of the carriage relative to the ground;
c) utilize the location data and the motion data in order to cause the harvesting device to move to and harvest the crop.

It will be understood by one skilled in the art that the term "harvesting" in the context of this document should be interpreted as referring to activities related to the harvesting of crops, for example the picking of crops for future consumption, the picking of crops for the 'thinning' of crop resources in order to promote more effective crop growth, the picking of crops to remove spoiled or overly mature crops, etc.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

Embodiments of the invention will now be described by way of example only with reference to the accompanying drawings in which:

FIG. 4 is a cut-away sectional view of the harvesting apparatus of FIG. 1 taken along line A-A of FIG. 2;

Figure 1:
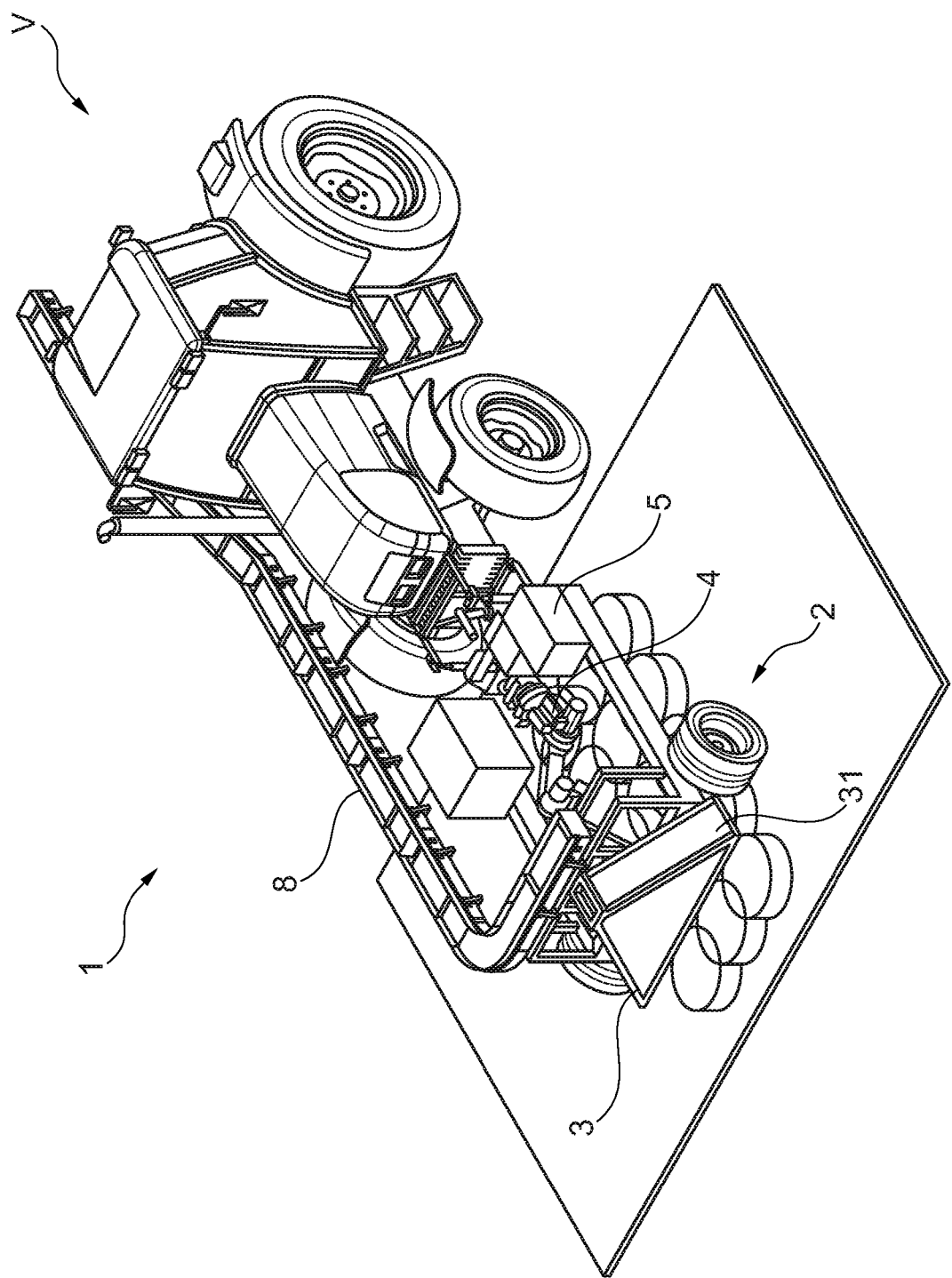
FIG. 1 is a perspective view of a harvesting apparatus according to the invention attached to a tractor.

Referring now to FIGS. 1 to 5a, there is shown a harvesting apparatus 1 attached to the front end of a vehicle V, which in this embodiment is a tractor.

Prior to use in a field of crops the harvesting apparatus 1 is attached to the front of the tractor via a coupling C which provides a secure and detachable connection thereto. For conveyance of the harvesting apparatus 1 between different fields of crops it may be convenient to detach the harvesting apparatus 1 from the front of the tractor and to attach the harvesting apparatus 1 to the rear of said tractor via the same coupling C or a further coupling (not shown), instead. The coupling C (and further coupling, where provided) may be configured or configurable to lift the harvesting apparatus 1 clear of the ground over which it is disposed.

The harvesting apparatus 1 includes a carriage 2 comprising a frame 20 with wheels 21. A camera station 3, a harvesting device 4, a control system 5, a ground motion sensor 6 and a container 7 are secured to the carriage 2. Additionally, an optional conveyor 8 is provided, running between the container 7 and a collection trailer (not shown) attached to the rear end of the tractor.

It will be appreciated by one skilled in the art that the harvesting apparatus 1 is primarily (although not exclusively) intended for outdoor use and, consequently, the materials from which the various component parts are formed are therefore chosen in order to resist corrosion due to exposure to environmental factors such as rain. Furthermore, the materials are selected in order to provide sufficient rigidity and strength to the thus formed components. Additionally the various components, in particular components including electrical aspects, are selected in order that they remain operational across a suitable range of temperatures.

Figure 2:
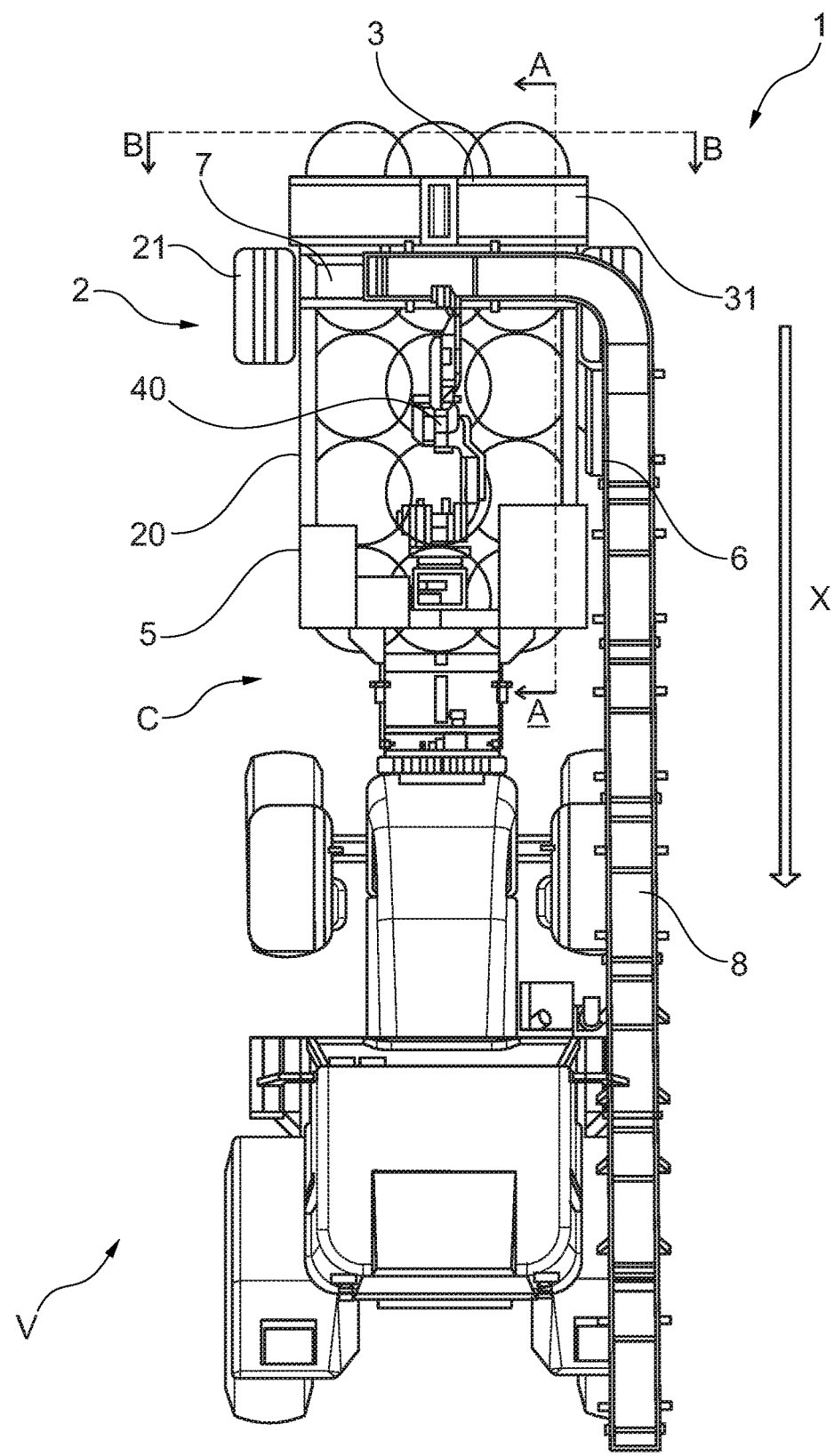
FIG. 2 is a plan view of the harvesting apparatus and tractor of FIG. 1.

The harvesting device 4 is located on the harvesting apparatus 1 such that it is downstream of the camera station 3 when the harvesting apparatus 1 is in use, e.g. in motion in a harvesting direction, as indicated by arrow X in FIG. 2.

Figure 5A:
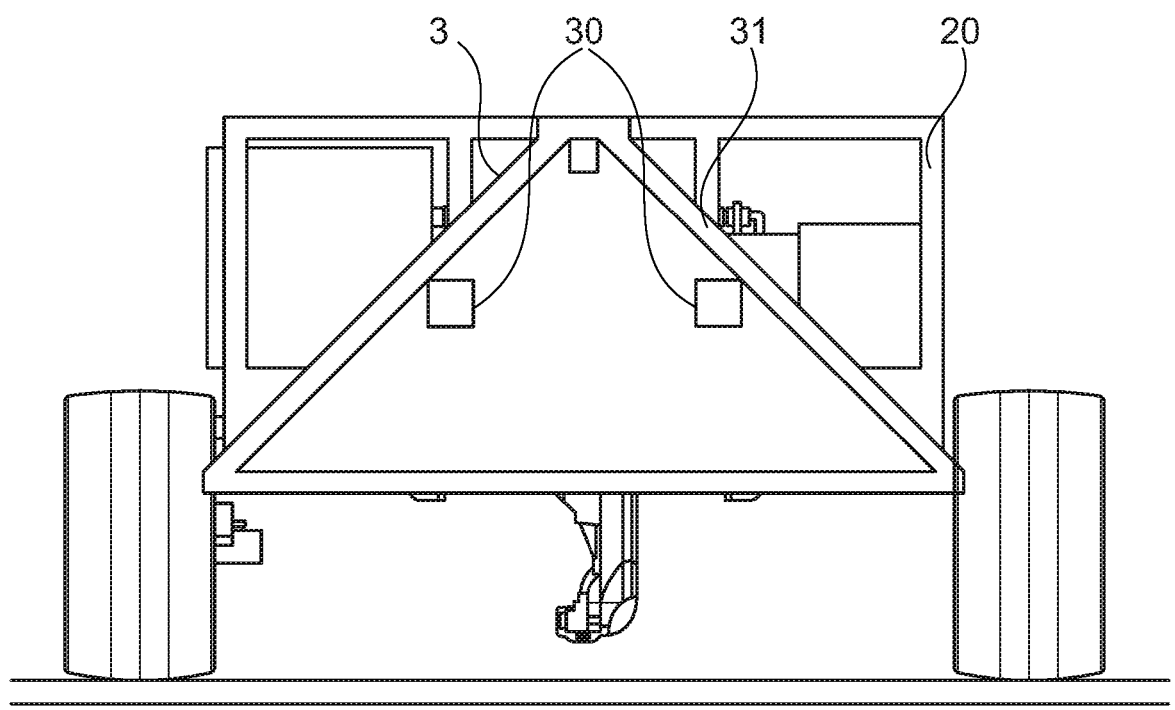
FIG. 5a is a cut-away sectional view of the harvesting apparatus of FIG. 1 taken along line B-B of FIG. 2.

The camera station 3 (as shown in FIG. 5a) includes image capture means 30 which comprises two cameras (not shown) optionally mounted inside a protective cover 31. The two cameras are spaced apart by any suitable distance, and are located at a height above a surface (e.g. the ground), which is relatively underneath the harvesting apparatus 1. The height is configured such that the field of view of the two cameras encompasses a suitable viewing area. Together the two cameras are configured to capture a stereoscopic view of the surface over which the harvesting apparatus 1 passes. In this way, the height and location of crops is able to be determined, as will be explained in greater detail later.

The protective cover 31 is configured to protect the cameras 30 from exposure to environmental factors, such as precipitation. Additionally or alternatively, the protective cover 31 may be configured to at least partially mitigate against the ingress of ambient light into the cameras 30, for example such that an increased percentage of the light entering the cameras 30 is light reflected from the surface covered by the field of view of the cameras 30. Additionally or alternatively, the protective cover 31 may be configured to maintain a substantially constant average brightness of light therewithin and/or adjacent the cameras 30. Advantageously, provision of a protective cover 31 configured as described above has been found to result in less interference of image data captured by the cameras 30. Consequently, it has been found that location data, size data and/or condition data relating to a crop may be more reliably, accurately and rapidly calculated from said captured image data.

Figure 5B:
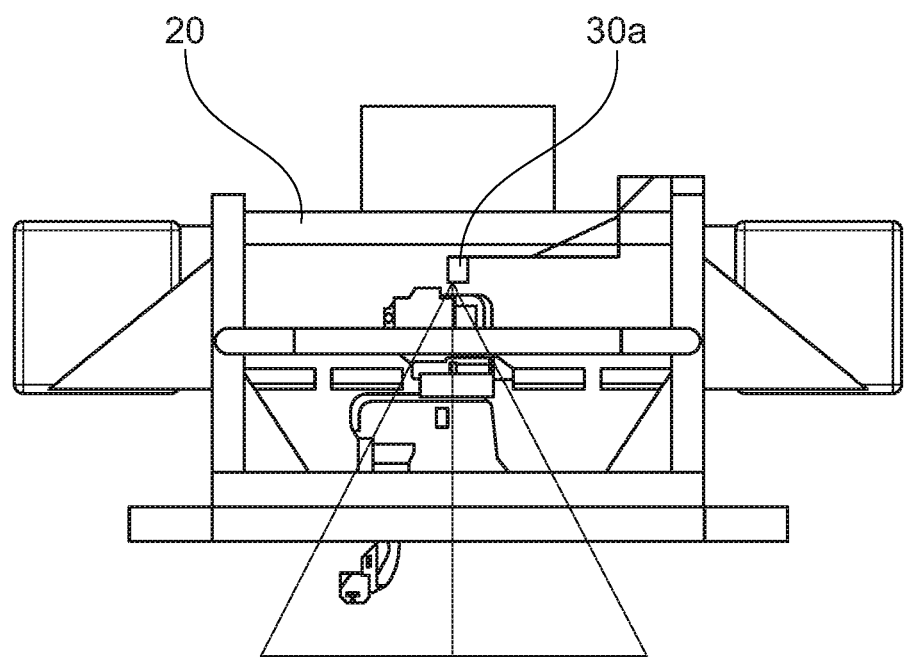
FIG. 5b is a cut-away sectional view of the harvesting apparatus of FIG. 1 taken along line B-B of FIG. 2 according to a further embodiment of the invention.

In embodiments, the image capture means 30 comprises a 3D camera 30a (as shown in FIG. 5b) mounted inside the protective cover 31. The 3D camera 30a is positioned within the camera station 3 such that it is at a height above a surface (e.g. the ground), which is relatively underneath the harvesting apparatus 1. The height is configured such that the field of view of the 3D camera 30a encompasses a suitable viewing area (as shown in FIG. 5b). In this embodiment the 3D camera 30a is a Gocator 2380 Camera® available from Stemmer Imaging of Puchheim, Germany. It will be appreciated, however, by those skilled in the art that other 3D cameras 30a may also be suitable. The protective cover, when provided, may protect the image capture means 30 from the elements, dirt, dust etc. and may also be opaque so as to at least partially limit light transmittance.

Figure 9:
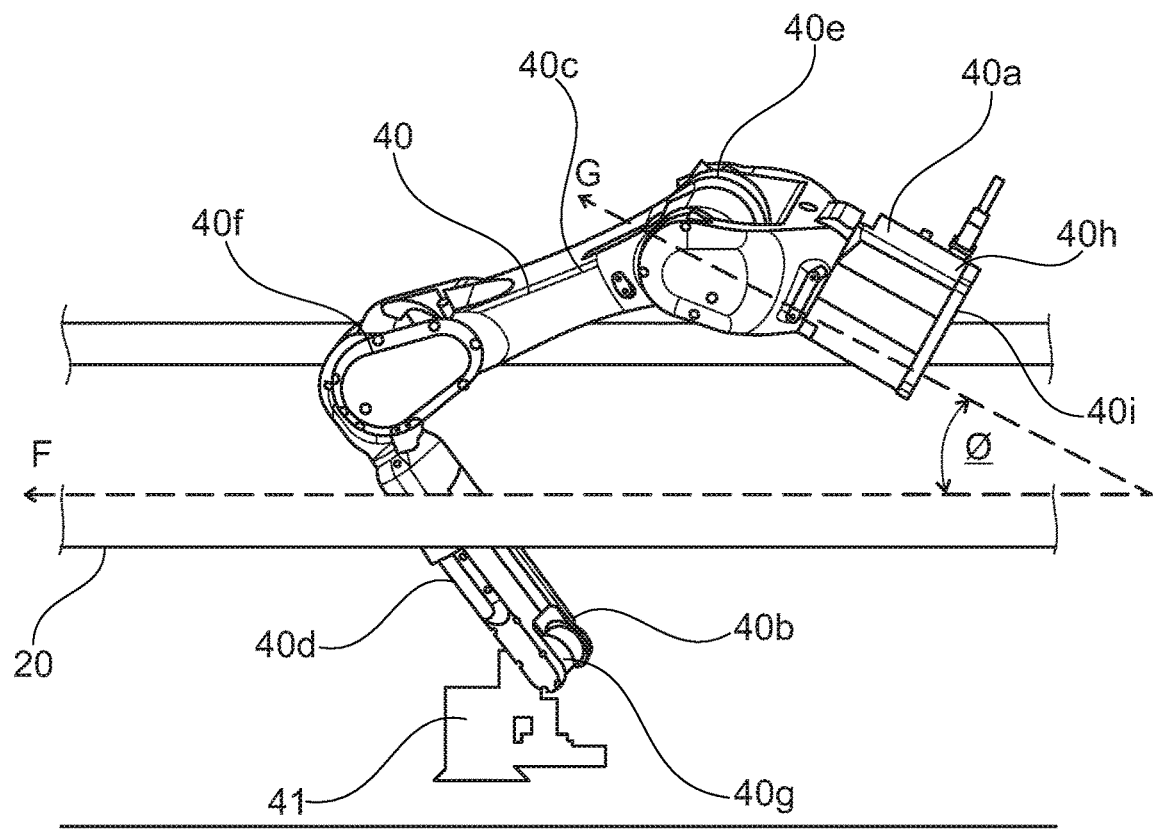
FIG. 9 is a view of a cutting head attached to the end of the robot arm of the harvesting apparatus shown in FIG. 1.

The harvesting device 4 (as shown in FIG. 9) includes a robot arm 40 and a cutting head 41. The robot arm 40 has a first, securement end 40a, secured to the carriage 2, and a second, free end 40b to which the cutting head 41 is attached (not shown in FIGS. 1 to 5). The robot arm 40 includes first and second arm members 40c, 40d, first, second and third joints 40e, 40f, 40g and a connection member 40h. In this embodiment the robot arm 40 is a FANUC M10iA/12 (available from FANUC of Oshino, Yamanashi Prefecture, Japan) and is capable of 6-axis movement. It will be appreciated, however, by those skilled in the art that other robot arms 40 may also be suitable.

The first joint 40e of the robot arm 40 is attached to the connection member 40h. The first joint 40e is the joint nearest to the attachment of the robot arm 40 to the frame 20. When the robot arm 40 is attached to the frame 20 the first joint 40e extends away from the attachment in a direction G which is at an acute angle ø with respect to the primary direction F in which the frame 20 extends. The angle ø may be between about 40 and 80 degrees, say between about 45, 50 or 55 and 65, 70 or 75 degrees. Advantageously, we have found that attachment of the robot arm 40 to the frame 20 at an angle ø as described above relatively increases the throw of the robot arm 40. Accordingly, a robot arm 40 attached to the frame 20 at such an angle ø is able to direct the cutting tool 41 to a relatively greater area of the space within (and/or about) the frame 20, relative to a robot arm 40 attached to the frame 20 at a perpendicular angle.

Figure 6:
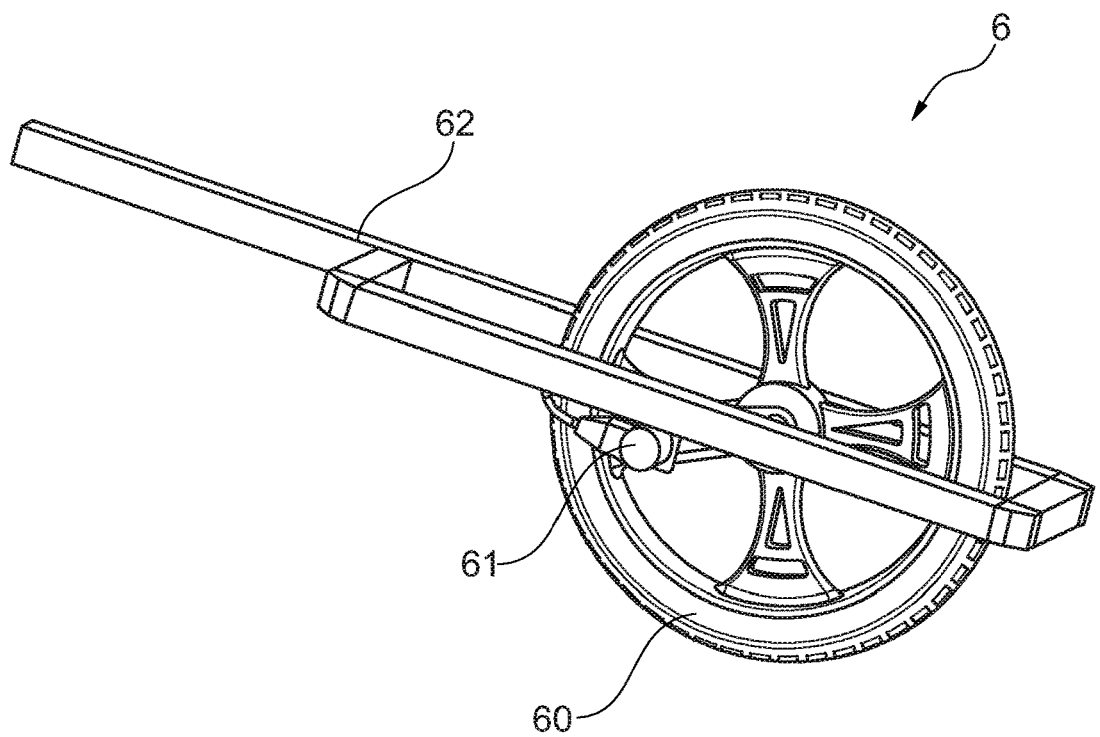
FIG. 6 is a photograph of a component of the harvesting apparatus shown in FIG. 1.

The ground motion sensor 6 includes a non-driven wheel 60 and a pulse coder 61 (as shown in FIG. 6) which, in this embodiment, is a FANUC aA1000S PulseCoder®, although those skilled in the art will appreciate that other pulse coders 61 or encoders may also be suitable. The non-driven wheel 60 includes a rim and a hub, joined together by a plurality of spokes. The pulse coder 61 is located adjacent the non-driven wheel 60 and is configured to measure the angular displacement thereof relative to a starting datum in order to generate motion data of the harvesting apparatus 1 relative to the ground. The hub of the non-driven wheel 60 is attached to a support frame 62. One end of the support frame 62 is pivotably attached to the frame 20 of the carriage 2 (see FIG. 3). A potentiometer (not shown) is arranged to measure, in use, the relative angular movement of the support frame 62 with respect to the frame 20 to which it is attached. In embodiments it will be appreciated that in addition or as an alternative to the potentiometer any other suitable sensor for measuring deflection may be used.

The control system 5 is operatively connected to the cameras 30 and the harvesting device 4 by a wireless or wired connection. The control system 5 includes memory and a processor. A database of crop image data is stored on the memory. In embodiments the control system 5 may be operatively connected to a remote server which may have at least a portion of the database of crop image data stored thereon. One or more computer programs are loaded into the control system 5 in order to: compare captured image data with the database of crop image data, calculate the size of identified crops within said captured image data; determine the location of identified crops within said captured image data; calculate velocity data relating to the velocity of the harvesting apparatus 1 relative to the ground from motion data received from the ground motion sensor 6; utilize the location data and the velocity data; and control the harvesting device 4 to harvest crops at locations corresponding to the location data.

Figure 7:
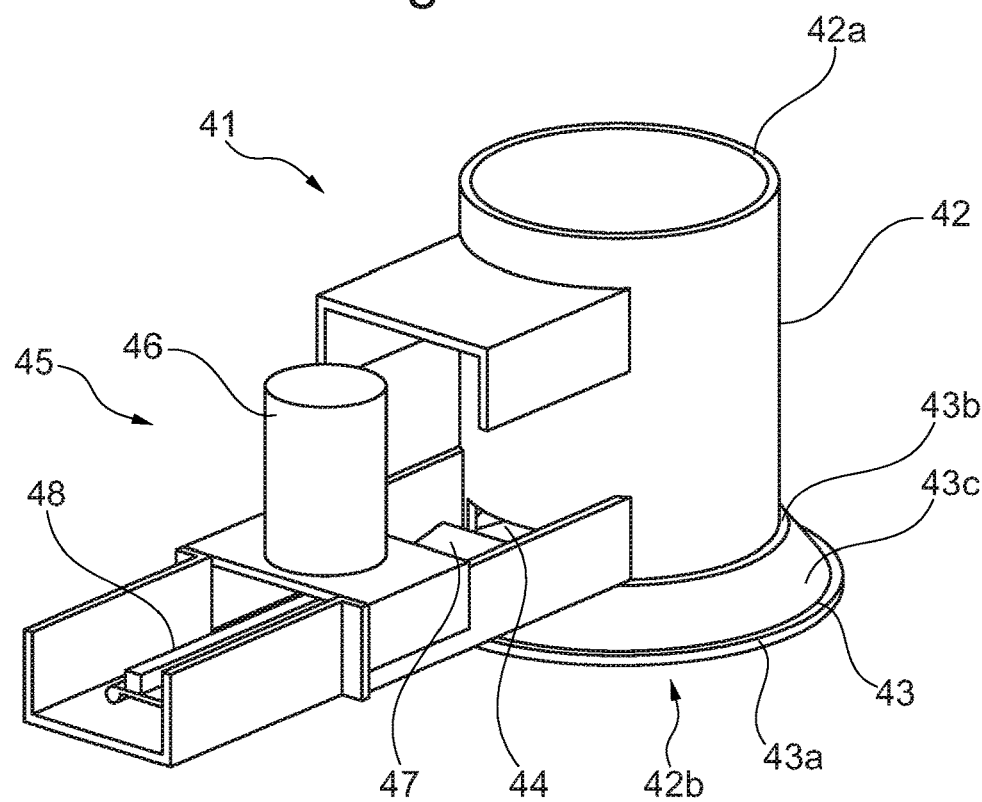
FIG. 7 is a diagrammatic perspective view of a cutting head for use with the harvesting apparatus shown in FIG. 1.

Referring now to FIG. 7, there is shown a cutting head 41 according to one embodiment of the invention. The cutting head 41 includes a receptacle 42 with a first, free end 42a and with a deflector 43 at its second end 42b. The second end 42b of the receptacle 42 includes an opening (not shown) which communicates with the hollow interior of the receptacle 42. Both the opening and the hollow interior have a diameter which is configured to be greater than the external diameter of crops to be harvested. The deflector 43 surrounds the opening in the receptacle 42. The deflector 43 includes a base ring 43a and a connection ring 43b connected by a tapering deflection skirt 43c, which is frustoconical in shape. The connection ring 43b is adjacent and attached to the second end 42b of the receptacle 42 and has a similar internal diameter thereto. The base ring 43a has a greater internal diameter than does that of the connection ring 43b.

The deflector 43 is integrally formed with the receptacle 42 in this embodiment, although in embodiments the deflector 43 may be a separate component attached or attachable to the receptacle 42.

There is a cutting aperture 44 through the wall of the receptacle 42, adjacent the deflector 43. A cutting apparatus 45 is secured to the receptacle 42, where the cutting apparatus 45 includes a motor 46, a blade 47 and a rack and pinion system 48. The blade 47 is attached to the rack and pinion system 48 and is movable thereby via actuation of the motor 46. The blade 47 includes a cutting edge (not shown) at a proximal end. The blade 47 and rack and pinion system 48 are aligned with the cutting aperture 44 such that actuation of the motor 46 deploys or retracts the cutting edge of the blade 47 through said cutting aperture 44. The blade 47 is configured, when deployed, to prevent a crop of a predetermined size from passing it (e.g. the blade 47 is configured to have a surface area on one side such that, when deployed, the blade 47 reduces the free area of the hollow interior of the receptacle 42 to a restricted area through which a crop may not pass).

Figure 8:
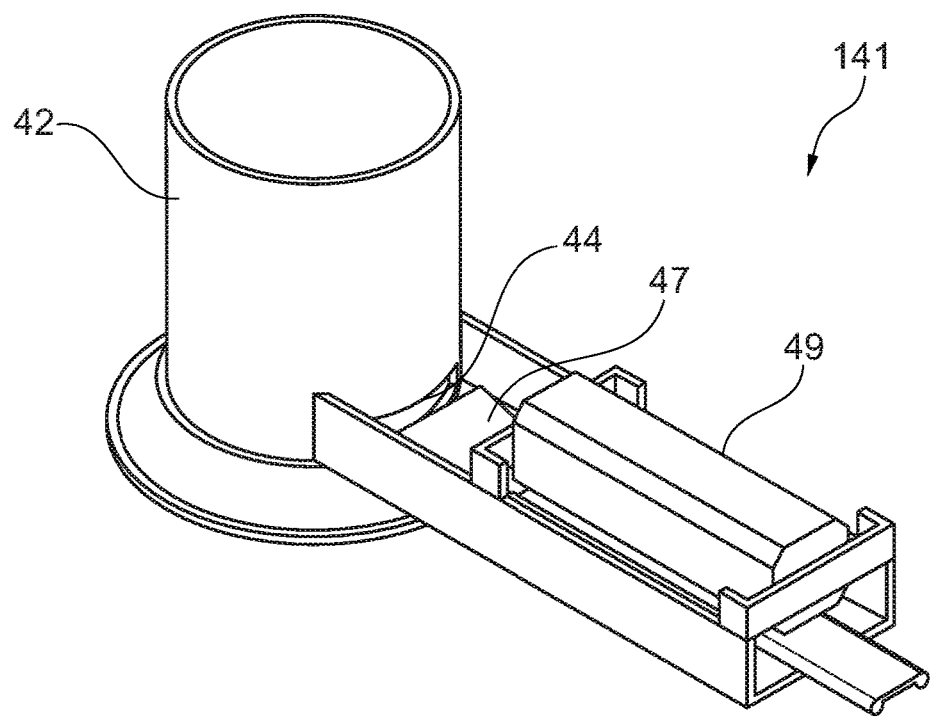
FIG. 8 is a diagrammatic perspective view of an alternative cutting head for use with the harvesting apparatus shown in FIG. 1.

Referring now to FIG. 8, there is shown a cutting head 141 according to an alternative embodiment of the invention, where like references refer to like features which will not be described herein further. The cutting head 141 of FIG. 8 differs from the cutting head 41 of FIG. 7 in that the cutting apparatus 45 includes a pneumatic piston 49 instead of a motor 46 and a rack and pinion system 48. The blade 47 is attached to the pneumatic piston 49, both of which are aligned with the cutting aperture 44 in the wall of the receptacle 42 such that the cutting edge of the blade 47 may be deployed or retracted through said cutting aperture 44. The pneumatic piston 49 is connected to a source of compressed air (not shown) and to the control system 5.

Referring now to FIG. 9, there is shown the cutting head 41 attached to the second, free end 40b of the robot arm 40.

Figure 3:
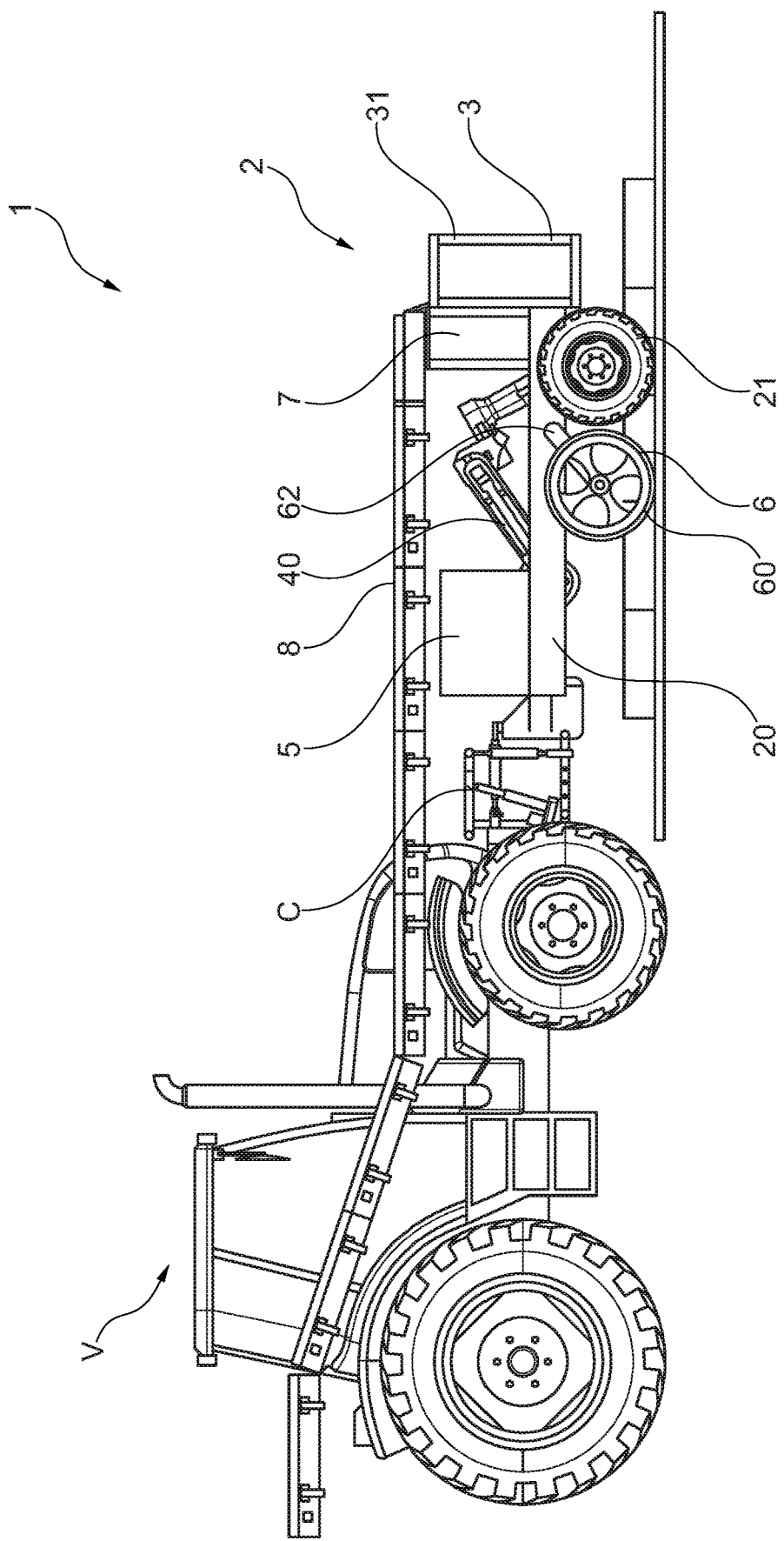
FIG. 3 is a side view of the harvesting apparatus and tractor of FIG. 1.

The relative position of the cameras 30 with respect to a datum position of the frame 20 is stored in the memory. Additionally, a starting height of the lowermost (as shown in FIG. 3) part of the non-driven wheel 60 with respect to the or a datum position of the frame 20 is also stored in the memory.

A relative starting position of the second, free end 40b of the robot arm 40 and/or the cutting head 41 with respect to the or a datum position of the frame 20 is also stored in the memory.

In use the, harvesting apparatus 1 is transported over a site to be harvesting by the tractor in the direction of arrow X in FIG. 2. The cameras 30 capture image data within their field of view and transmits the captured image data to the control system 5. The captured image data is then compared with the database of crop image data stored in the control system 5 in order to determine whether one or more crops are present.

When a first crop is identified in the captured image data a computer program, running on the control system 5, calculates the size of the first crop, for example based upon length, width and/or height, which is calculated from the captured image data transmitted to said control system 5. The size of the first crop is then compared with a pre-set range of sizes for harvestable crops.

A computer program, running on the control system 5, generates a stereoscopic image from the received captured image data from the two cameras 30.

The computer program, running on the control system 5, calculates location data for the first crop relative to the cameras 30 and hence relative to the datum of the frame 20. The location data comprises 3D location data, for example X and Y coordinates relating to the transverse and longitudinal location of the crop relative to the datum and a Z coordinate corresponding to the height of the first crop relative to the datum.

In embodiments, a computer program, running on the control system 5, is operable to determine the condition of an identified first crop within captured image data, for example via identification of one or more attributes of the first crop, such as the colour of the whole or a part thereof.

The control system 5 then calculates the velocity of the harvesting apparatus 1 relative to the ground via motion data gathered from the ground motion sensor 6 in order to generate velocity data. When the non-driven wheel 60 rotates over the ground underneath the harvesting apparatus 1 the pulse coder determines the angular displacement of the non-driven wheel 60 at set times, corresponding to motion data. The control system 5 converts this motion data into velocity data by calculating the angular displacement over a given time period. The control system 5 then utilizes the location data and the velocity data in order to generate accurate positioning data.

If the size of the first crop is within a range deemed suitable for harvesting (for example, greater than a pre-set minimum size and less than a pre-set maximum size—e.g. within a pre-set range of harvestable sizes) then the control system 5 controls the robot arm 40 to move the cutting head 41, 141 to the location of the crop based upon the positioning data. If the size of the first crop is outside of a range deemed suitable for harvesting (for example greater than a pre-set maximum size or less than a pre-set minimum size—e.g.

outside of a pre-set range of harvestable sizes), which we call 'rejected crops', then the control system 5 does not control the robot arm 40 to move the cutting head 41, 141 to the location of the crop. In either circumstance, the control system 5 continues to compare captured image data from the cameras 30 with the database of crop image data stored in the control system 5.

When the control system 5 has controlled the robot arm 40 to move the cutting head 41, 141 to the location of the first crop, the cutting head 41, 141 is positioned so that the opening of the receptacle 42 is directly adjacent said crop. The robot arm 40 is then commanded to move the receptacle 42 over the crop so that a desired portion of the first crop is located within said receptacle 42. The desired portion of the crop may relate to a specific height which may correspond to one or more measured characteristics of the first crop and/or to the measured size, e.g. height, of said first crop. The cutting head 41, 141 is lowered onto the first crop so that it passes into the receptacle 42 through the opening. Simultaneously, the deflection skirt 43c of the deflector 43 contacts any obstructions, for example foliage, leaves, weeds, etc., adjacent the first crop and deflects them away therefrom.

Once the desired portion of the crop is within the receptacle 42 the cutting apparatus 45 is actuated by the control system 5 to deploy the blade 47 through the cutting aperture 44. The cutting edge of the blade 47 slices through part of the crop, for example through a stem thereof, and severs the desired portion of the crop from the remainder of the crop plant.

The robot arm 40 is then commanded to move the receptacle 42 containing a harvested crop to the location of a second crop which has been identified and located according to the above-described method. The robot arm 40 is then commanded to move the receptacle 42 over the second crop so that a desired portion of said second crop is located within the receptacle 42. Concurrent with movement of the receptacle 42 over the second crop the cutting apparatus 45 is actuated to retract the blade 47. Consequently, the blade 47 does not prevent the desired portion of the second crop from entering the receptacle 42. Furthermore, the first crop is supported and hence retained within the receptacle 42 by the second crop. Once the desired portion of the second crop is within the receptacle 42 the cutting apparatus 45 is actuated by the control system 5 to deploy the blade 47 through the cutting aperture 44 again and hence sever the desired portion of the second crop from the remainder of the second crop plant.

This sequence of cutting may be repeated any suitable number of times such that any suitable quantity of crop portions are retained within the receptacle 42. The sequence may be ended due to any of the following factors and any combination of the following factors:

the mass of harvested crops within the receptacle 42 exceeding a predetermined limit;

the volume of harvested crops within the receptacle 42 exceeding a predetermined limit;

the quantity of harvested crops within the receptacle 42 exceeding a predetermined number;

the height of a stack of harvested crops within the receptacle 42 exceeding a predetermined height;

the volume of available space within the container 7 exceeding a predetermined value;

the mass of harvested crops within the container 7 not having reached a predetermined value;

the time between detection of crops having a size within the pre-set range of harvestable sizes exceeding a predetermined time; and/or a pre-determined time interval having elapsed.

When the sequence is ended the robot arm 40 is commanded to move the cutting head 41, 141 toward the container 7, into which the harvested crop or crops (or portions thereof) may be deposited. Deposition of the harvested crop or crops (or portions thereof) may be achieved via retraction of the blade 47 from the receptacle 42. Additionally or alternatively, deposition of the harvested crop may be achieved via at least a partial inversion of the receptacle 42 such that the crop falls into the container 7.

One or more harvested crops (or portions of crops) may then be transferred from the container 7 to a collection trailer (not shown) via the conveyor 8 or any other suitable means of transport.

Advantageously, the deflector 43 at least partially prevents unwanted objects from entering the receptacle 42 alongside the desired portion of the first crop. In this way the volume of material harvested by the harvesting apparatus 1 includes a relatively higher percentage of crop matter relative to other, unwanted matter. Moreover, at least partially preventing unwanted objects from entering the receptacle 42 ensures substantially unfettered access of the blade 47 of the cutting apparatus 45 to the crop (or a stem thereof). Consequently, there is a reduced probability of the cutting edge of the blade 47 contacting material other than the crop and hence a reduced probability of the cutting edge of the blade 47 becoming blunted and/or fractured through contact with a material harder than the crop. Provision of a deflector 43 which is movable in concert with the receptacle 42 beneficially provides for quicker harvesting of a crop relative to a system having a separate deflector 43. Therefore, the harvesting apparatus 1 may move relatively more quickly across a field harvesting crops, leading to a consequential relative reduction in both the time and expense of harvesting said crops (and hence also a relatively reduced cost of said crops to a customer).

Crops may advantageously be cut at specific heights relative to the ground and/or relative to a particular feature of the crops, for example the peak of the crown of a broccoli head. Furthermore, crops may advantageously, be cut at specific heights relative to the or a datum of the frame.

The distance (in the z-axis) between the or a datum of the frame and the top or peak of a detected first crop may be calculated by the control system 5 from image data captured by the cameras 30 (for example from stereoscopic image data generated therefrom). The cutting head may be controlled to move, in use, to a location over the detected first crop (as described above). The cutting head may then be controlled to move to a height relative to the datum of the frame 20 such that the blade 47 is at a pre-determined distance below (in the z-axis direction) the calculated height of the top or peak of the detected first crop. The pre-determined distance may correspond to the length of stalk which is desired on a harvested crop, for example.

Broccoli, for example, may advantageously be severed at a height of 150 mm below the peak of the crown of its head, such that the length of stalk remaining attached to the head of the harvested broccoli crop is between predetermined lengths. Particular customers, for example particular supermarkets or wholesalers, may stipulate specific limits to the lengths of stalks attached to harvested broccoli crops. Consequently, harvesting broccoli crops in the above-described manner has been found to remove the need to subsequently remove additional portions of the stalk in order to meet customer demands. Therefore, this method of harvesting results in savings of both time and expense of further processing. Furthermore, if broccoli crops are not severed at the correct height relative to their crown and/or the ground the crops may fall outside of customer requirements (for example if not enough stalk is retained or if the crown itself has been partially removed). Said crops may be rejected by the customer and may therefore be wasted, leading to an increase in overall expense as well as a reduction in the efficiency of operation of the farmland upon which the crops are grown.

In embodiments, the control system 5 is programmed or operable to at least partially mitigate against contact of the cutting head 41 with the ground.

In embodiments, a computer program, running on the control system 5, is operable to calculate the relative height of a or the datum of the frame 20 above the ground over which the carriage 2 is located or is moving. The potentiometer is operable to send displacement data to the control system 5, where the displacement data relates to the angular displacement of the support frame 62 with respect to the frame 20. The control system 5 is operable to calculate the relative height of a or the datum of the frame 20 above the ground based upon the starting height stored in the memory modified by the displacement data received from the potentiometer.

When the cutting head 41 is moved to harvest a detected crop the control system 5 may be operable to prevent the cutting head (for example any part thereof) from moving to a location below (in the z-axis direction) the calculated height of the ground relative to the datum of the frame 20.

If the calculated height of the ground relative to the datum of the frame 20 is less than the calculated height of the peak or top of the detected first crop plus the pre-determined distance, the control system 5 may be programmed to prevent movement of the cutting head to the pre-determined distance beneath the calculated height of the peak or top of the detected first crop. Instead, the cutting head 41 may be moved to a location (in the z-axis direction) corresponding to the calculated height of the ground relative to the datum of the frame 20. In embodiments, the control system 5 may be programmed to lower the cutting head 41 to a distance from the datum of the frame 20 which is slightly less (for example by a pre-set distance) than the distance from the datum of the frame 20 corresponding to the calculated height of the ground relative to the datum of the frame 20.

Where the difference between the calculated height of the ground relative to the datum of the frame and the calculated height of the peak or top of the detected first crop plus the pre-determined distance is equal to or greater than a threshold value the cutting head 41 may be prevented from harvesting the relevant crop. In such a situation the control system 5 may be programmed to not move the cutting head 41 to such a crop.

By calculating the height of the ground relative to the datum of the frame 20, contact between the cutting head 41 and the ground may be at least partially mitigated against. Consequently, the cutting head 41 is thereby prevented from removing a quantity of ground (e.g. soil or other matter) when harvesting a detected crop. Beneficially, the incidence of impurities intermingled with harvested crops is thence relatively reduced with a consequential reduction in the need for post processing of the harvested crops. Furthermore, the cutting head may be protected from impact damage against the ground.

In embodiments, the control system 5 is programmed or operable to prevent the cutting head 41 from moving within a set distance of the calculated relative distance of the ground from the datum of the frame 20.

Advantageously, we have found that using the above-described harvesting apparatus 1 and method it is possible to harvest broccoli more efficiently and more economically and with reduced impact upon the environment. It is a known practice for different customers to require different criteria of supplied crops. For example, some customers may specify broccoli within a first range of sizes whilst another customer may specify broccoli within a second range of sizes. The above-described harvesting apparatus 1 may be programmed to harvest only crops within the first range of sizes during a first pass over a field of broccoli. The thus harvested broccoli within said first range of sizes may then be removed from the harvesting apparatus 1 and a second pass over the field of broccoli conducted in order to harvest only crops within the second range of sizes. Alternatively, the container 7 may comprise plural compartments or plural vessels and the first and second range of sizes may be harvested simultaneously with broccoli corresponding to the first range of sizes deposited in a first compartment or set of compartments or vessel or vessels and broccoli corresponding to the second range of sizes deposited in a second compartment or set of compartments or vessel or vessels. Where the range of sizes overlap, harvested broccoli corresponding to either range of sizes may be deposited in one or either of the first or second compartment or compartments or vessel or vessels. Determination of which compartment or compartments or vessel or vessels broccoli may be deposited into where said harvested broccoli corresponds to either range of sizes may be based upon a pre-programmed sequence, e.g. one deposited into a first compartment or compartments or vessel or vessels and the next into a second compartment or compartments or vessel or vessels;

It will be appreciated that a harvest over a field of broccoli may comprise plural passes of the harvesting apparatus 1 over said field. For example, the location of 'rejected crops' may be stored to facilitate faster location during a subsequent pass. In this manner, if the rejected crops were, at the time of the first pass, too small or insufficiently ripe for harvesting then during the subsequent pass (which may be timed such that the prevailing growing conditions would have at least likely led to a suitable size increase or ripening) the system will be primed to look at that location and not at previously harvested locations, thereby enabling the vehicle V to traverse the field at a faster rate than would otherwise have been possible. The system can also be used to harvest and dump other rejected crops, for example crops which have grown too much t be of commercial value. In such a case the threshold conditions of whether to (i) leave in the ground (e.g. rejected crop to small or not ripe enough), (ii) harvest or (iii) harvest and dump (e.g. rejected crop too large, too ripe or 'blown') as determined by the control system 5 will determine the action of the harvesting apparatus 1.

We have surprisingly found that temporarily retaining one or more harvested crop (or one or more harvested portions of crops) within the cutting head 41, 141, as described above, prior to deposition of said harvested crops (or harvested portions of crops) in the container 7, is particularly advantageous. By relatively reducing the frequency of journeys that the cutting head 41, 141 makes from a harvested crop to the container 7 and back to a further crop the cutting head 41, 141 can be sent to a relatively greater number of crops in a given time. Consequently, by use of the above-described system, we have surprisingly found that the harvesting apparatus 1 may be moved at a relatively greater velocity across a crop field whilst maintaining the same or a greater rate of harvesting crops than were the case if each harvested crop were deposited in the container 7 following its harvesting by the cutting head 41, 141. Moreover, such relatively faster harvesting of crops provides a resultant relatively reduced expense of harvesting due to reduced operating costs (e.g. fuel) and therefore to relatively reduced expense of harvested crops. Furthermore, it is possible for the harvesting apparatus 1 to harvest crops from a relatively larger crop field than would be the case otherwise.

Generation of accurate positioning data from the location data and the velocity data from the ground motion sensor 6 has been advantageously found to produce more accurate location of the cutting head 41, 141 at the location of a crop. Consequently, the cutting head 41, 141 is sent to the exact location of the detected crop which may therefore be harvested with relatively greater efficiency, speed and a reduced incidence of damage thereto. Due to this reduction in damage the rejection rate (for example by customers) of so harvested crops is relatively lower than for crops harvested without the use of accurate positioning data utilizing velocity data from a ground motion sensor 6. Consequently, use of the above-described system produces harvested crops having a relatively reduced expense.

Moreover, automated harvesting by the above described method and using the above described harvesting apparatus 1 allows for harvesting of crops at night. Advantageously, harvesting at night results in the harvesting of relatively lower temperature crops with consequentially reduced energy requirements for cooling of the harvested crops. Furthermore, during the night there is less ambient light and, consequently, the image capture means 30 may function with relatively greater accuracy and/or reduced interference from ambient light.

Beneficially, it has also been found that harvesting of crops using the above described method and using the above described harvesting apparatus 1 allows for a reduced expense of harvesting. The work-force required to manually harvest crops comprises many times the number of personnel required to operate the above described apparatus 1. Accordingly, the wage-bill of harvesting crops using the above described apparatus 1 is lower than using manual harvesting.

It will be appreciated by one skilled in the art that although broccoli crops have been described in relation to the advantages of the inventive method the benefits thereof are equally applicable to other crops.

Figure 10:
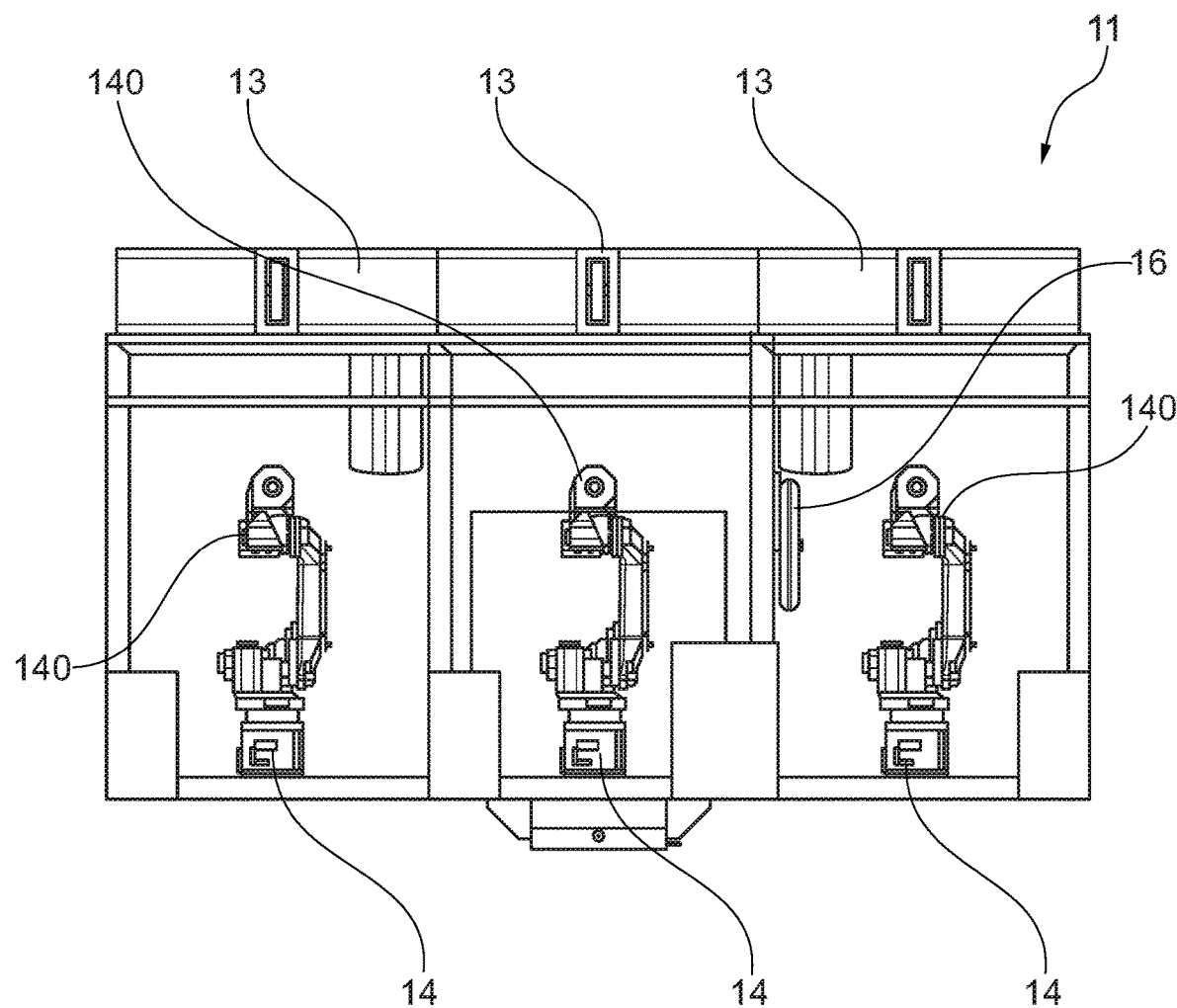
FIG. 10 is a partial plan view of a harvesting apparatus according to a further embodiment of the invention.

Referring now to FIG. 10 (integers similar or identical to those of the first embodiment are identified by a preceding '1') there is shown a harvesting apparatus 11 including three harvesting devices 14 and three camera stations 13. Each of the harvesting devices 14 includes a robot arm 140 and a cutting head (not shown) as described above in respect of the embodiment shown in FIG. 1. The harvesting apparatus 11 also includes a ground motion sensor 16. The harvesting apparatus 11 may include any suitable convening means or conveyor for transporting harvested crops away from the cutting zone. In embodiments, the harvesting apparatus 11 may include one, two, three or any suitable number of conveyors.

In some embodiments a vehicle V may be coupled to plural sets of harvesting apparatus 1, for example so as to harvest, in parallel, multiple rows of crops.

It will be appreciated by those skilled in the art that several variations to the aforementioned embodiments are envisaged without departing from the scope of the invention. For example, although the vehicle attached to the harvesting apparatus 1 shown in FIG. 1 is a tractor this need not be the case and the vehicle may instead be any suitable vehicle for providing locomotion to the harvesting apparatus 1. Additionally or alternatively, the harvesting apparatus 1 may be integrally formed with a means of locomotion.

Additionally or alternatively, although the image capture means is described as including two cameras 30 this need not be the case and the image capture means may comprise any suitable number of cameras 30 and/or any other suitable image capture device or devices (for example one or more IR camera and/or 3D camera).

Additionally or alternatively, although the control system 5 is described as calculating velocity data from motion data received from the ground motion sensor 6 this need not be the case and instead the ground motion sensor 6 may calculate the velocity data itself and transmit this information to the control system 5. Additionally or alternatively, although the ground motion sensor 6 is described as including a non-driven wheel 60 and a pulse coder this need not be the case and instead the ground motion sensor 6 may include a contactless measurement device, for example which may be directed toward the ground (in use) so as to measure motion data of the ground relative to the harvesting apparatus 1 at specific times. The specific times may correspond to predetermined time intervals and/or to times relating to the identification of one or more crops within captured image data or the calculation of location data relating to said one or more crops within captured image data. The contactless measurement device may comprise a radio frequency device, e.g. a radio frequency transceiver.

Additionally or alternatively, although broccoli crops have been described above it will be appreciated that the method and harvesting apparatus 1 are suited to any other type of crop.

Additionally or alternatively, although the cutting head 41, 141 is described as including a blade 47 with a cutting edge this need not be the case and instead the cutting head 41, 141 may include a laser or fluid (e.g. water) cutter or any other suitable form of cutting device. Where the cutting head 41, 141 includes a laser cutter or fluid cutter the cutting head 41, 141 may also include a movable abutment. When a crop (or a portion thereof) has been severed from the remainder of the crop plant the movable abutment may be deployed across at least part of the opening of the receptacle 42 in order to retain the crop (or the crop portion) within the receptacle 42. The movable abutment may then be retracted from the opening of the receptacle 42 prior to deposition of the crop (or crop portion) into the container 7 or prior to movement of the cutting head 41, 141 over a further crop (or further crop portion).

Additionally or alternatively, although the computer program, running on the control system 5, is described as sequentially calculating the size of the first crop, the location of the first crop the velocity of the harvesting device relative to the ground this need not be the case and instead all of these actions may occur concurrently or in any suitable order. Additionally or alternatively, where the size of the first crop is determined first, the other actions need not be undertaken at all if the size of the first crop is determined to be outside of a pre-set range of harvestable sizes. Alternatively, even if the size of the first crop is determined to be outside of a pre-set range of harvestable sizes the location of the first crop may still be calculated and may be stored in local memory and/or transmitted to remote memory with or without corresponding size data relating to the detected crop.

Additionally or alternatively, the harvesting apparatus 1 (or at least a portion thereof) may be covered by a canopy or other suitable cover, for example configured to protect the harvesting apparatus 1 (or a portion thereof) from exposure to one or more environmental conditions.

Additionally or alternatively, although the harvesting apparatus 11 shown in FIG. 10 includes one ground motion sensor 16 this need not be the case and instead the harvesting apparatus 11 may include any suitable number of ground motion sensors 16, for example two, three or more. Additionally or alternatively, the harvesting apparatus 11 shown in FIG. 10 may include only one camera station 13 or two camera stations 13 or any suitable number thereof. Additionally or alternatively, the harvesting apparatus 11 shown in FIG. 10 may include any suitable number of harvesting devices 14, for example two, four or more.

It will also be appreciated by those skilled in the art that any number of combinations of the aforementioned features and/or those shown in the appended drawings provide clear advantages over the prior art and are therefore within the scope of the invention described herein.

The invention claimed is:

1. A method for harvesting crops in a single pass over the crops using a carriage provided with a harvesting device comprising a robotic arm, the method comprising:
   a) capturing image data with a sensor and then utilizing a processor to determine location data relating to a first crop based on the captured image data;
   b) capturing motion data of the carriage relative to a ground surface using a ground motion sensor;
   c) the processor determining the suitability of the first crop for harvesting either prior to or concurrent with step a); and
   d) the processor utilizing the location data and the motion data and causing the robotic arm to move to the first crop and the harvesting device to harvest the first crop only if the first crop is determined to be suitable for harvesting in step c), wherein the method comprises continuously moving the carriage in use.

2. The method according to claim 1, wherein the location data comprises x, y and z coordinates and where the z coordinates comprise data relating to the height of at least a part of the first crop relative to the ground surface.

3. An apparatus for harvesting crops, the apparatus comprising a carriage carrying a sensor, a ground motion sensor, a processor, and a harvesting device comprising arm, where the sensor captures data and the processor is configured to use the data to determine the location of a first crop and to generate crop condition data, the ground motion sensor captures motion data and the processor is configured use the motion data to determine the motion of the carriage relative to the ground, the processor configured to utilize the determined location and motion to cause the robotic arm to move to the first crop and the harvesting device to harvest the first crop only if the first crop is determined to be suitable for harvesting, the processor configured to determine the suitability either prior to or concurrent with determining the location of the first crop, and wherein the carriage continuously moves during the harvesting of the first crop.

4. The apparatus according to claim 3, wherein the sensor is spaced from the harvesting device.

5. The apparatus according to claim 3, wherein the sensor comprises an image capture device configured or configurable to capture image data relating to the location of the first crop and/or configured or configurable to capture image data relating to the condition of the first crop.

6. The apparatus according to claim 3, wherein the ground motion sensor comprises a wheel.

7. The apparatus according to claim 3, further comprising a ground height sensor.

8. The method according to claim 1, wherein determining the suitability of the first crop for harvesting comprises capturing condition data relating to the first crop.

9. The method according to claim 8, wherein determining the suitability of the first crop for harvesting comprises comparing the captured condition data of the first crop with a database of crop condition data.

10. The method according to claim 8, wherein the sensor comprises an image capture device which is configured or configurable to capture image data relating to the condition of the first crop.

11. The method according to claim 8, comprising storing the condition data on a memory.

12. The method according to claim 9, comprising storing the condition data on a memory.

13. The method according to claim 11, comprising a remote server and/or a local memory.

14. The method according to claim 12, comprising a remote server and/or a local memory.

15. The method according to claim 1, comprising storing the location data and/or an indication of whether the crop was harvested on a memory comprising a remote server and/or a local memory.

16. The apparatus according to claim 3, comprising a memory storing or configured to store a database of crop condition data.

17. The apparatus according to claim 6, wherein the wheel is a non-driven wheel, and an encoder.

18. The apparatus according to claim 6, wherein the wheel is drawn by the carriage.

19. A method for harvesting crops in a single pass over the crops using a carriage provided with a harvesting device comprising a robotic arm, the method comprising:
  a) capturing image data with a sensor and then utilizing a processor to determine location data relating to a first crop based on the captured image data;
  b) the processor determining the suitability of the first crop for harvesting either prior to or concurrent with step a);
  c) capturing motion data of the carriage relative to a ground surface using a ground motion sensor only if the first crop is determined to be suitable for harvesting in step b); and
  d) the processor utilizing the location data and the motion data and causing the robotic arm to move to the first crop and the harvesting device to harvest the first crop only if the first crop is determined to be suitable for harvesting in step b), wherein the method comprises continuously moving the carriage in use.

* * * * *